(12) United States Patent
Fujimura

(10) Patent No.: US 7,705,767 B2
(45) Date of Patent: Apr. 27, 2010

(54) SYNTHETIC APERTURE RADAR AND PROCESSING METHOD OF REPRODUCING SYNTHETIC APERTURE RADAR IMAGE

(75) Inventor: Takashi Fujimura, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 12/033,485

(22) Filed: Feb. 19, 2008

(65) Prior Publication Data

US 2008/0204311 A1 Aug. 28, 2008

(30) Foreign Application Priority Data

Feb. 23, 2007 (JP) ............................. 2007/043093

(51) Int. Cl.
*G01S 13/90* (2006.01)
*G01S 13/00* (2006.01)

(52) U.S. Cl. .............. 342/25 A; 342/25 R; 342/73; 342/74; 342/175; 342/176; 342/179; 342/195; 342/196

(58) Field of Classification Search ...... 342/25 R–25 F, 342/175, 176, 179, 195, 192–194, 196, 197, 342/59, 61–82, 89, 118, 134–145, 189, 368–384; 375/362; 180/167–169
See application file for complete search history.

(56) References Cited

U.S. PATENT DOCUMENTS

| | | | | |
|---|---|---|---|---|
| 3,735,400 | A | * | 5/1973 | Sletten et al. .............. 342/25 B |
| 4,086,590 | A | * | 4/1978 | Goggins, Jr. .............. 342/25 B |
| 4,215,759 | A | * | 8/1980 | Diaz ........................... 180/168 |
| 4,244,036 | A | * | 1/1981 | Raven ....................... 342/25 A |
| 4,334,314 | A | * | 6/1982 | Nard et al. .................. 375/362 |
| 4,355,311 | A | * | 10/1982 | Frosch et al. ............. 342/25 A |
| 4,549,184 | A | * | 10/1985 | Boles et al. ................ 342/25 B |
| 4,825,213 | A | * | 4/1989 | Smrek ....................... 342/25 B |

(Continued)

FOREIGN PATENT DOCUMENTS

EP 1241487 A1 * 9/2002

(Continued)

OTHER PUBLICATIONS

J. Mittermayer et al., "Conceptual Studies for Exploiting the TerraSAR-X Dual Receiver Antenna" 2003 IEEE, pp. 2140-2142.

*Primary Examiner*—Bernarr E Gregory

(57) ABSTRACT

A synthetic aperture radar to provide high resolution in the azimuth direction under the predetermined conditions of wide observation swathwidth in the range direction, stripmap observation and free PRF (Pulse Repetition Frequency) comprises a transmission antenna 102 for a single system and receiving antennae 104a, 104b for two systems. The beam width in the azimuth direction of a transmission beam 103 from the transmission antenna 102 is set equal to twice as wide as the beam width of each of the receiving antennae 104a, 104b. Moreover, a receiving antenna beam 105a is directed to the moving direction, while the other receiving antenna beam 105b is directed to opposite to the moving direction. The transmission antenna 102 and the receiving antennae 104a, 104b for two systems are used in common by dividing a single array antenna in the elevation direction to configure the receiving antennae 104a, 104b. The antenna size of the transmission antenna 102 in the azimuth direction is set to one half of the antenna size of the receiving antennae 104a, 104b by phase setting of each element of the array antenna or by electrical means when transmitting.

14 Claims, 11 Drawing Sheets

U.S. PATENT DOCUMENTS

| | | | | |
|---|---|---|---|---|
| 4,978,960 | A | * | 12/1990 | Newcomb et al. ......... 342/25 C |
| 5,059,966 | A | * | 10/1991 | Fujisaka et al. ........... 342/25 A |
| 5,323,162 | A | * | 6/1994 | Fujisaka et al. ........... 342/25 B |
| 5,563,601 | A | * | 10/1996 | Cataldo .................... 342/25 A |
| 6,130,641 | A | * | 10/2000 | Kraeutner et al. .......... 342/179 |
| 6,388,606 | B1 | * | 5/2002 | Keydel et al. ............. 342/25 R |
| 7,196,653 | B2 | * | 3/2007 | Hall et al. .................. 342/25 F |
| 2004/0150547 | A1 | * | 8/2004 | Suess et al. ............... 342/25 A |

FOREIGN PATENT DOCUMENTS

JP    2004523760  A    8/2004

* cited by examiner

US 7,705,767 B2

SYNTHETIC APERTURE RADAR AND PROCESSING METHOD OF REPRODUCING SYNTHETIC APERTURE RADAR IMAGE

INCORPORATION BY REFERENCE

This application is based upon and claims the benefit of priority from patent application no. 2007-043093, filed on Feb. 23, 2007, the disclosure of which is incorporated herein in its entirety by reference.

FIELD OF THE INVENTION

This invention relates generally to a synthetic aperture radar and a processing method of reproducing synthetic aperture radar image, more specifically to a synthetic aperture radar achieving high resolution in the azimuth direction and a processing method of reproducing synthetic aperture radar image.

BACKGROUND OF THE INVENTION

Normally, the resolution of a synthetic aperture radar (referred to as SAR below) in the azimuth (abbreviated to Az below) direction, i.e., the moving or traveling direction of a movable platform on which the synthetic aperture radar is installed is about a half of the antenna size in the Az direction. Accordingly, it is necessary to reduce the antenna size in the Az direction in order to improve the resolution in the Az direction. This accompanies with increase in the Doppler bandwidth as shown in FIG. 8, thereby requiring for setting the pulse repetition frequency (referred to as PRF below) high in order to satisfy the sampling theory. On the other hand, if the PRF becomes higher, observation swathwidth in the range (abbreviated to Rg below) direction is restricted. This means that higher resolution in the Az direction and wider observation swathwidth in the Rg direction are trade off. Now, reference is made to FIG. 8 for describing problems encountering when reproducing SAR images in a normal SAR. When the antenna size is reduced in order to provide a wider transmission beam, the Doppler bandwidth (i.e., synthetic aperture bandwidth) becomes wider, thereby requiring for setting the PRF high.

A spotlight SAR illustrated in FIG. 9 has been proposed as conventional means to overcome the aforementioned problem. The spotlight SAR is designed to expand the synthetic aperture bandwidth and improve the resolution in the Az direction by scanning in time in the moving direction and the opposite direction thereto. FIG. 9 describes how to reproduce SAR images by the spotlight SAR. By scanning the transmission beam of a normal bandwidth in time in the moving direction, the synthetic aperture bandwidth of a receiving beam is expanded without expanding the Doppler bandwidth, thereby enabling to produce high Az resolution images. However, the spotlight SAR has the following problems: Firstly, the beam must be scanned in time in the Az direction. Moreover, it is unable to make a band observation (or stripmap observation) that is possible in the normal synthetic aperture radar.

An alternative method is to employ a dual receive antenna (abbreviated to DRA below) mode in a TerraSAR-X as shown in FIGS. 10 and 11. The receiving antenna is electrically divided into two in the Az direction and the PRF is set so that receiving positions (phase centers) of the two antennae are alternatively arranged. By synthesizing or combining the data that are received by the both receiving antennae, the PRF is virtually doubled (this is a technique similar to the one disclosed in J. Mittermayer and H. Runge, "Conceptual studies for exploiting the TerraSAR-X dual receiver antenna" (non-patent document 1). In this approach, it is made possible to have a wide Doppler bandwidth, i.e., a high resolution in the Az direction while maintaining the actual PRF low. FIG. 10 shows how to reproduce SAR images in the DRA mode of the TerraSAR-X. It uses a wide bandwidth transmission beam and synthesizes both receiving data of the two receiving antennae with adjusted phase center of the beams. As a result, the PRF is virtually doubled while maintaining the actual PRF low, thereby expanding the synthetic aperture bandwidth of the receiving beam and producing images of high resolution in the Az direction. FIG. 11 shows the phase relationship between the transmission and receiving beams in the DRA mode of the TerraSAR-X, wherein phase centers of the data received by the two receiving antennae are alternately located in time along the moving direction.

However, in this method of using the DRA mode, it is necessary to set the PRF so that the phase positions (phase centers of transmission and receiving antennae) of the data received by the receiver 1 and the receiver 2 are alternately disposed, thereby making it impossible to freely set the PRF.

Similarly, in Japanese patent publication entitled "Side Monitoring SAR System" (Japanese Patent Publication no. 2004-523760, patent document 1) discloses a technique of achieving both high resolution and wide band observation by integrating a transmission by one small transmission antenna and receiving by a large number of small receiving antennae. In case of the patent document 1, receiving data of a plurality of receiving antennae are synthesized to achieve high resolution similarly to the case of the DRA mode of the TerraSAR-X as described hereinabove, thereby expanding the virtual PRF and achieving a wide Doppler bandwidth, while maintaining the actual PRF low.

However, it is also necessary in the method as disclosed in the patent document 1 to alternately arrange the phase position (phase centers of the transmission and receiving antennae) of the data received by the respective receivers similar to the aforementioned case in the DRA mode of the TerraSAR-X, thereby making it impossible to freely set the PRF.

As apparent from the foregoing descriptions, it was difficult in the conventional SAR to achieve high resolution in the Az direction under the condition of wide observation swathwidth in the Rg direction, the stripmap observation and free PRF setting.

SUMMARY OF THE INVENTION

In view of the above circumstances, it is the object of the present invention to provide a synthetic aperture radar (SAR) and a method of processing synthetic aperture radar images for enabling high resolution in the azimuth direction under wide range directional observation swathwidth, stripmap observation and free PRF setting conditions.

In order to overcome the above problems and to achieve the aforementioned object, the synthetic aperture radar and the method of processing synthetic radar images according to the present invention employ the following constituent features.

(1) A synthetic aperture radar installed on a movable platform for acquiring radar images of surfaces on the ground or the sea, comprising: a transmission antenna for a single system and receiving antennae for two systems, the width in the azimuth direction of a transmission antenna beam from the transmission antenna is set twice as wide as that of the receiving antenna beam of each of the receiving antennae, the receiving antenna beam of one of the receiving antennae for the two systems is directed to the moving direction of the movable platform, while the receiving antenna beam of the other receiving antenna is directed to the opposite direction.

(2) A synthetic aperture radar of the above (1), wherein the transmission antenna for a single system and the receiving antennae for two systems are used in common and the receiving antennae for two systems are configured by dividing a single array antenna into two in the elevation direction.

(3) A synthetic aperture radar of the above (2), wherein the antenna beam width of the transmission antenna in the azimuth direction is set equal to twice the antenna beam width of each of the receiving antennae in the azimuth direction by phase setting of each element of the array antenna or doubling the antenna beam width when transmitting by electrically halving the antenna size of the transmission antenna to the antenna size of the receiving antenna.

(4) A synthetic aperture radar of the above (2), wherein the receiving antenna beams of the receiving antennae for two systems are directed to the moving direction of the movable platform and the opposite to the moving direction by phase setting of each element of the array antenna.

(5) A synthetic aperture radar of the above (1), wherein separate antennae are disposed in the elevation direction with one of the receiving antenna beam of the receiving antennae for two systems directed to the moving direction of the movable platform and the receiving antenna beam of the other receiving antenna directed to the opposite to the moving direction of the movable plat form, while sharing the antennae with the transmission antenna.

(6) A synthetic aperture radar of the above (1), wherein the transmission antenna for a single system and the receiving antennae for the two systems disposed in the elevation direction are configures as different antennae.

(7) A synthetic aperture radar of the above (1), wherein the transmission antenna for a single system and the receiving antennae for two systems are configured as different antennae disposed in the azimuth direction.

(8) A synthetic aperture radar of the above (6), wherein the antenna size in the azimuth direction of the transmission antenna is set to one half of the antenna size in the azimuth direction of the receiving antennae or the antenna size of the transmission antenna when transmitting is electrically set to one half of the antenna size of the receiving antennae.

(9) A synthetic aperture radar of the above (7), wherein the antenna size in the azimuth direction of the transmission antenna is set to one half of the antenna size in the azimuth direction of the receiving antennae or the antenna size of the transmission antenna when transmitting is electrically set to one half of the antenna size of the receiving antennae.

(10) A synthetic aperture radar of the above (1), wherein directivities of the transmission and receiving beams of the transmission antenna for a single system and the receiving antennae for two systems are shifted in back and forth direction by an amount equal to one half of the beam width by slanting one of the receiving antennae for two systems to the moving direction of the movable platform, while slanting the other antenna to the opposite direction.

(11) A synthetic aperture radar of the above (1), wherein only Doppler frequency portions in the Doppler frequency domain of the two receiving data that are received by the receiving antennae for two systems are extracted and bandwidth synthesized as the bandwidth synthesized data of a single receiving data.

(12) A synthetic aperture radar of the above (11), wherein a correction for difference in the range distances between the receiving antennae for two systems and the target is made when bandwidth synthesizing as the bandwidth synthesized data of a single receiving data.

(13) A synthetic aperture radar of the above (1), wherein the range Doppler method is employed for reproducing an image.

(14) An image reproduction processing method for reproducing a radar image of ground or sea surface from receiving data that are acquired by transmission and receiving antennae of a synthetic aperture radar installed on a movable platform, comprising the steps of: setting the beam width in the azimuth direction of the transmission antenna from the transmission antenna for a single system of the synthetic aperture radar equal to twice as wide as the beam width of the receiving antenna beam of each of the receiving antennae for two systems; directing the receiving antenna beam of one of the two receiving antennae to the moving direction of the movable platform, while directing the receiving antenna beam of the other receiving antenna to the opposite to the moving direction of the movable platform; and reproducing the radar image based on the two receiving data that are received by the two receiving antennae.

The synthetic aperture radar and the method of processing synthetic aperture radar images according to the present invention exhibit the following advantages.

Firstly, it is possible to synthesize the receiving data having the bandwidth equal to about two times of the Doppler bandwidth corresponding to the beam width of the one system receiving antenna, thereby doubling the resolution in the azimuth direction.

Secondly, because the PRF (pulse repetition frequency) may be any value equal to or higher than the original Doppler bandwidth, it is possible to have a wide observation swathwidth by increasing the PRF and without the need for increasing the beam width unlike the normal SAR as shown in FIG. 8 that requires to increase the PRF for widening the beam width in order to increase the resolution.

Thirdly, it is possible to perform the stripmap observation because of not performing the spotlight SAR observation such as in FIG. 9 and it is possible to perform the stripmap observation and it is possible to simplify the antenna control as compared to the case of spotlight SAR because the receiving antenna pattern in the azimuth direction may be fixed unlike the case of the spotlight SAR.

Fourthly, different from the resolution improvement of the DRA mode in the TerraSAR-X as shown in FIGS. 10 and 11, it is possible to set the PRF to any value higher than the Doppler bandwidth. Moreover, without synthesizing the receiving data from two systems, even the receiving data from one system satisfies the sampling theory and is able to reproduce as a SAR image, thereby enabling to easily apply to the quick look processing.

As described hereinabove, the synthetic aperture radar according to the present invention exhibits both advantages of high resolution in the azimuth direction and wide observation swathwidth in the range direction. Moreover, it achieves simple antenna control, stripmap observation, free setting of the PRF and simple quick look processing.

Additionally, the synthetic aperture radar for performing a polarimetry observation by the use of both horizontally and vertically polarized waves is fundamentally provided with receivers in two systems, thereby enabling to effective use of the receivers in two systems for achieving the present invention without causing significant hardware impact.

BRIEF DESCRIPTION OF DRAWINGS

In the accompanying drawings.

DETAILED DESCRIPTION OF EXEMPLARY EMBODIMENTS

Now, exemplary embodiments of the synthetic aperture radar (SAR) and the processing method of reproducing SAR image according to the present invention will be described in detail with reference to the accompanying drawings.

(Features of the Present Invention)

Prior to description of exemplary embodiments of the present invention, features of the present invention will be described first. The synthetic aperture radar (SAR) according to the present invention is installed on a moving platform for acquiring radar images (SAR images) of the surface of ground and sea (or ocean). It comprises a transmission antenna for a single system and a pair of receiving antennae for two systems. The beam width in the azimuth direction of the transmission antenna is set to be twice of the beam width of the receiving antenna. One of the receiving antennae for two systems is directed to the moving direction, while the other receiving antenna is directed to the opposite to the moving direction.

As a result, Doppler frequencies of the set of receiving data that are received by the receiving antennae of two systems are shifted to high and low. Only the Doppler bandwidth portions in the Doppler frequency domain of the both receiving data are extracted and bandwidth synthesized as a single set of data, thereby enabling to generate a bandwidth synthesized data having a bandwidth equal to substantially twice as wide as the original Doppler bandwidth. SAR images of high resolution in the azimuth direction can be reproduced by performing SAR image reproduction on the bandwidth synthesized data.

(Construction of Embodiment)

Figure 1:
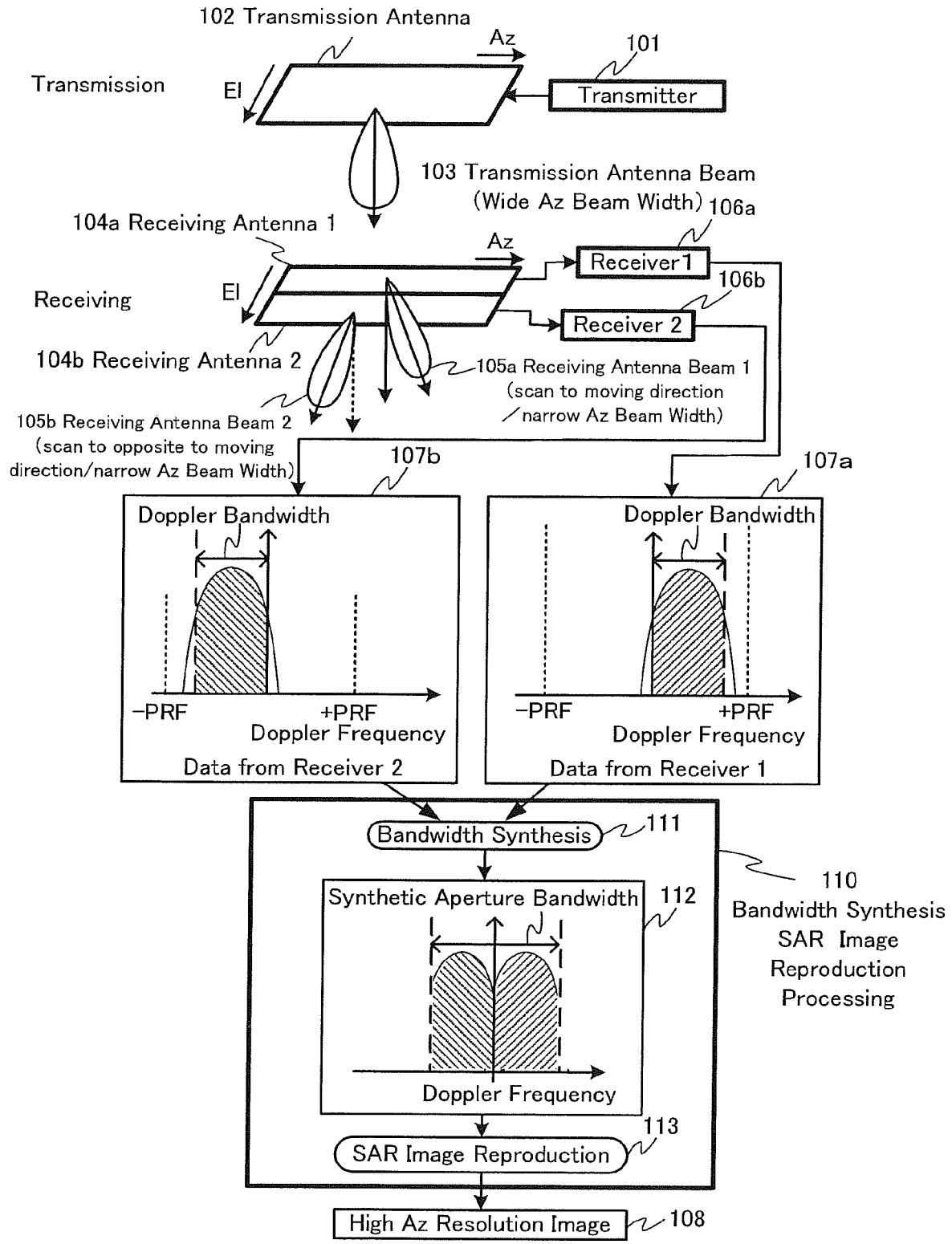
FIG. 1 is conceptual illustrations for showing the construction of one example of the synthetic aperture radar according to the present invention.

FIG. 1 shows the construction of an exemplified embodiment of the synthetic aperture radar according to the present invention. As shown in FIG. 1, its hardware comprises at least a transmitter 101 and a transmission antenna 102 for a single system, receiving antennae 104a, 104b and receivers 106a, 106b corresponding to the receiving antennae 104a, 104b for two systems, a bandwidth synthesis and SAR image reproduction processing unit 110 for performing image processing of the two set of receiving data that are received by the receivers 106a, 106b.

It is to be noted that the transmission antenna 102 and the receiving antennae 104a, 104b are shared and the receiving antennae 104a, 104b for two systems are realized by dividing a single array antenna into two parts in the elevation direction (E1). The beam width of the transmission antenna beam 103 in the azimuth direction is chosen to be a wide Az beam width equal to about twice of those of the receiving antenna beams 105a, 105b from the receiving antennae 104a, 104b by phase setting of each element of the array antenna in such a manner that the dimension of the transmission antenna 102 in the azimuth direction is about one half of those of the receiving antennae 104a, 104b. Alternatively, when transmitting, it is possible that the dimension of the antenna in the azimuth direction is electrically set to one half of the receiving antennae 104a, 104b, thereby doubling the width of the transmission beam in the azimuth direction.

Directions of the beam directivity of the receiving antennae 104a, 104b are set so that the direction of the beam directivity of one of receiving antennae is slanted to the moving direction, while that of the other receiving antenna is slanted to the opposite direction with respect to that of the transmission antenna 102. It is to be noted that means for setting the directions of beam directivity of the receiving antennae 104a, 104b are realized by setting the phase of each element of the array antenna. Although the direction of the directivity of the receiving antenna 104a disposed at the left side in the moving direction (i.e., the receiving antenna 1) is slanted to the moving direction, while that of the receiving antenna 104b disposed at the right side in the moving direction (i.e., the receiving antenna 2) is slanted to the opposite direction in FIG. 1, it is possible that the receiving antenna 104a is slanted to the opposite direction, while the receiving antenna 104b is slanted to the moving direction.

In the synthetic aperture radar that uses the transmission antenna 102 and receiving antennae 104a, 104b whose directions of beam directivity are adjusted as mentioned hereinabove, the receiving data 107a, 107b that are received by the receivers 106a, 106b of the two systems shift to high and low directions when seen in the Doppler frequency domain. In other words, the receiving data 107a that is received by the receiving antenna 104a that is slanted to the moving direction shifts to the higher frequency side and the receiving data 107b that is received by the receiving antenna 104b is shifted to the lower frequency side.

In a bandwidth synthesis and SAR image reproduction processing unit 110, only portion of the respective Doppler bandwidth in the Doppler frequency domain of the receiving data 107a, 107b that are shifted to higher and lower sides is first extracted and synthesized as a single set of data by a bandwidth synthesizer 111 in the bandwidth synthesis and SAR image reproduction processing unit 110 after making correction of the range (Rg) distance. A bandwidth synthesized data 112 that is generated in the above manner has the bandwidth equal to about twice as wide as the Doppler bandwidth as compared to that of each of the original receiving data 107a, 107b. After generating the bandwidth synthesized data 112, an SAR image reproduction processing is performed on the bandwidth synthesized data 112 by an SAR image reproduction processor 113 in the bandwidth synthesis and SAR image reproduction processing unit 110, thereby reproducing the SAR image data 108 of high resolution in the azimuth direction.

Although the bandwidth synthesis and SAR image reproduction processing unit 110 performs the SAR image reproduction processing in the SAR image reproduction processor 113 after bandwidth synthesizing in the bandwidth synthesizer 111, it is possible to perform bandwidth synthesis during the SAR image reproduction process for improving efficiency of the processing.

It is also possible to extend the configuration as shown in FIG. 1 by dividing the receivers 106*a*, 106*b* and the receiving antennae 104*a*, 104*b* into n (integers) larger than two for further improving resolution.

(Description of Operation of the Exemplary Embodiment)

Figure 2:
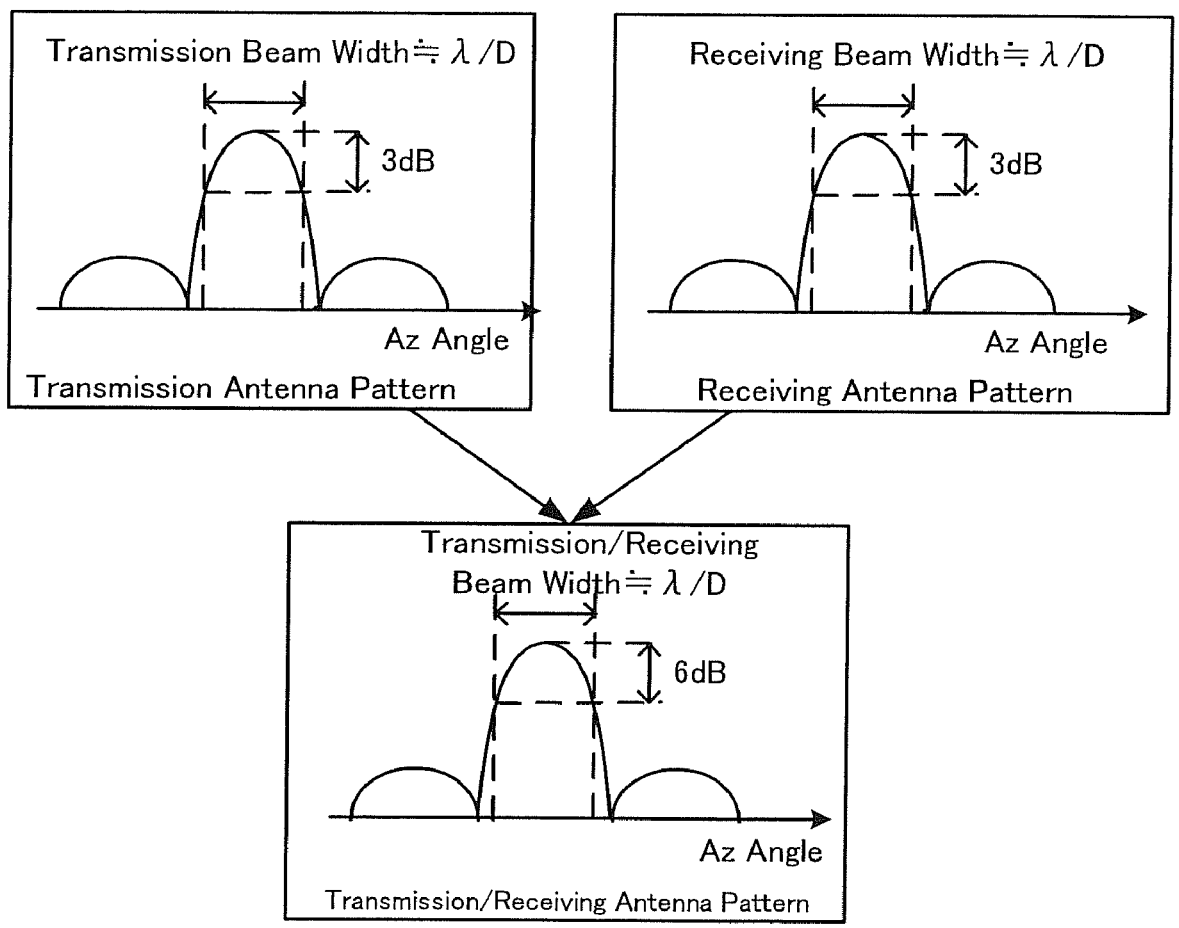
FIG. 2 shows antenna patterns in the azimuth direction of the normal synthetic aperture radar.

Normally, the beam width of the antenna in the azimuth direction is defined at −3 dB point from the peak both in transmission and receiving as shown in FIG. 2 and is approximated by $\lambda/D$, where D represents the antenna dimension and $\lambda$ represents the wavelength. On the other hand, in consideration of both transmission and receiving, the beam width is defined at −6 dB point and approximated by $\lambda/D$. FIG. 2 illustrates the antenna pattern of the normal synthetic aperture radar in the azimuth direction. Since the Doppler bandwidth of the synthetic aperture radar is proportional to the beam width, the Doppler bandwidth of a synthetic aperture radar of the normal antennae configuration is proportional to $\lambda/D$.

Figure 3:
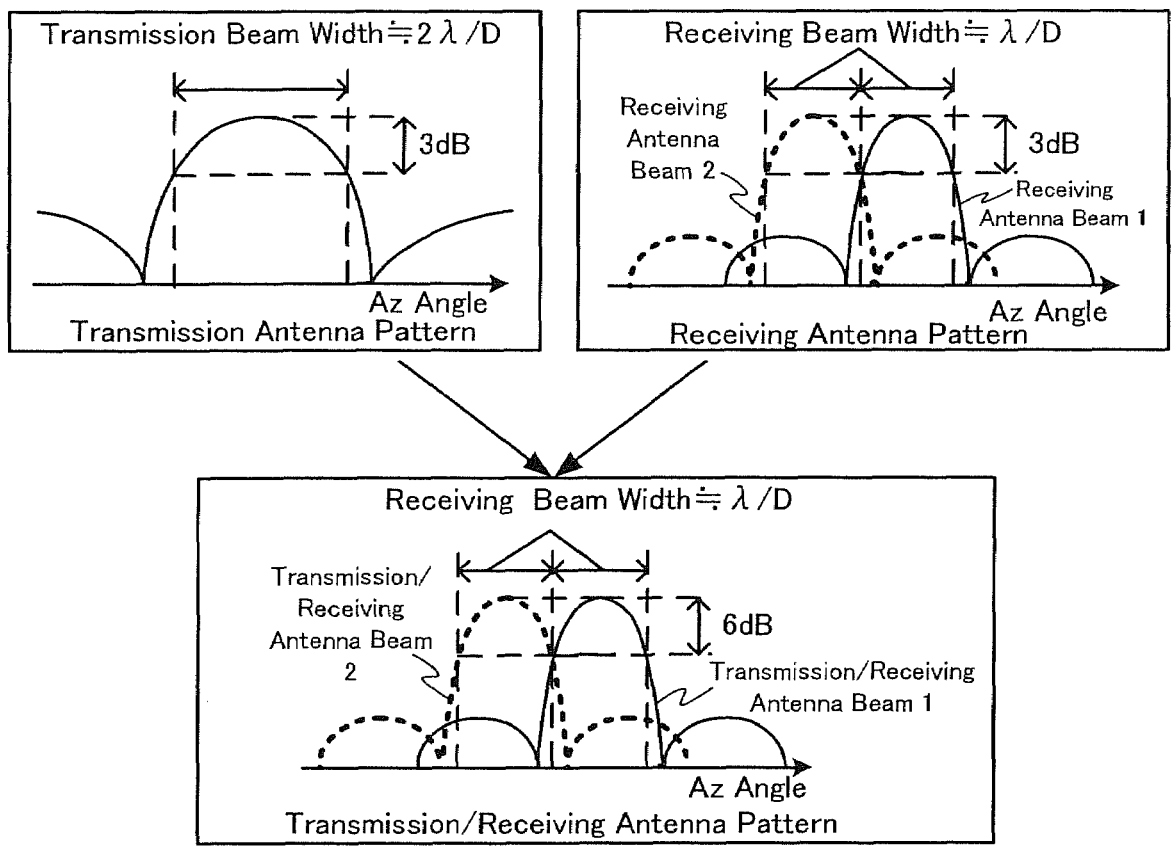
FIG. 3 shows antenna patterns in the azimuth direction of an exemplary embodiment of the synthetic aperture radar according to the present invention.

On the other hand, in case of the antennae in the synthetic aperture radar according to the present invention as shown in FIG. 3, the antenna beam width when transmission is set to twice as wide as that of the receiving antenna by halving the antenna dimension of the transmission antenna in the azimuth direction with respect to that of the receiving antenna as a result of phase setting of each element of the array antenna or by electrically halving the antenna dimension to that of the receiving antenna in the azimuth direction when transmitting. As a result, if the antenna dimension is D and the wavelength is $\lambda$, then the beam width at −3 dB point of the transmission antenna 103 is approximated to $2\lambda/D$. FIG. 3 illustrates the antenna pattern in the azimuth direction of the antennae in the synthetic aperture radar according to the exemplary embodiment of the present invention.

As for the receiving side, the beam width at the −3 dB point of each of the two receiving antennae 104*a*, 104*b* is approximated to $\lambda/D$ similar to the case of the normal antenna as shown in FIG. 2. However, by directing the two receiving antennae 104*a*, 104*b* in the forward and backward of the azimuth direction equal to half of the beam width as shown in FIG. 3, it is possible to coincide the beam width of the two receiving antennae 104*a*, 104*b* with the range of the beam width of the transmission antenna 103.

Since the transmission and receiving beam widths depend on the one of narrower beam width, the two transmission and receiving beam widths are strictly wider than those of the receiving antennae 104*a*, 104*b* but can be approximated to $\lambda/D$ of the receiving antennae 104*a*, 104*b*. As shown in FIG. 3, the directivities of the two transmission and receiving beams are shifted are forwardly and backwardly shifted to one half of the beam width. It is to be noted that the Doppler bandwidth of the two transmission and receiving data as defined at −6 dB point is approximated substantially equal to $\lambda/D$ of the Doppler bandwidth in case of the normal antenna configuration.

However, the Doppler frequency of the receiving data 107*a* (or the receiving data 1) is higher by the half bandwidth than the case of the normal configuration as shown in FIG. 2. On the contrary, the Doppler frequency of the receiving data 107*b* (or the receiving data 2) is lower by the half bandwidth than the normal configuration as shown in FIG. 2. As a result, synthesis of the Doppler bandwidths of the both receiving data 107*a*, 107*b* ensures to provide the Doppler bandwidth approximately equal to $2\lambda/D$.

Figure 4:
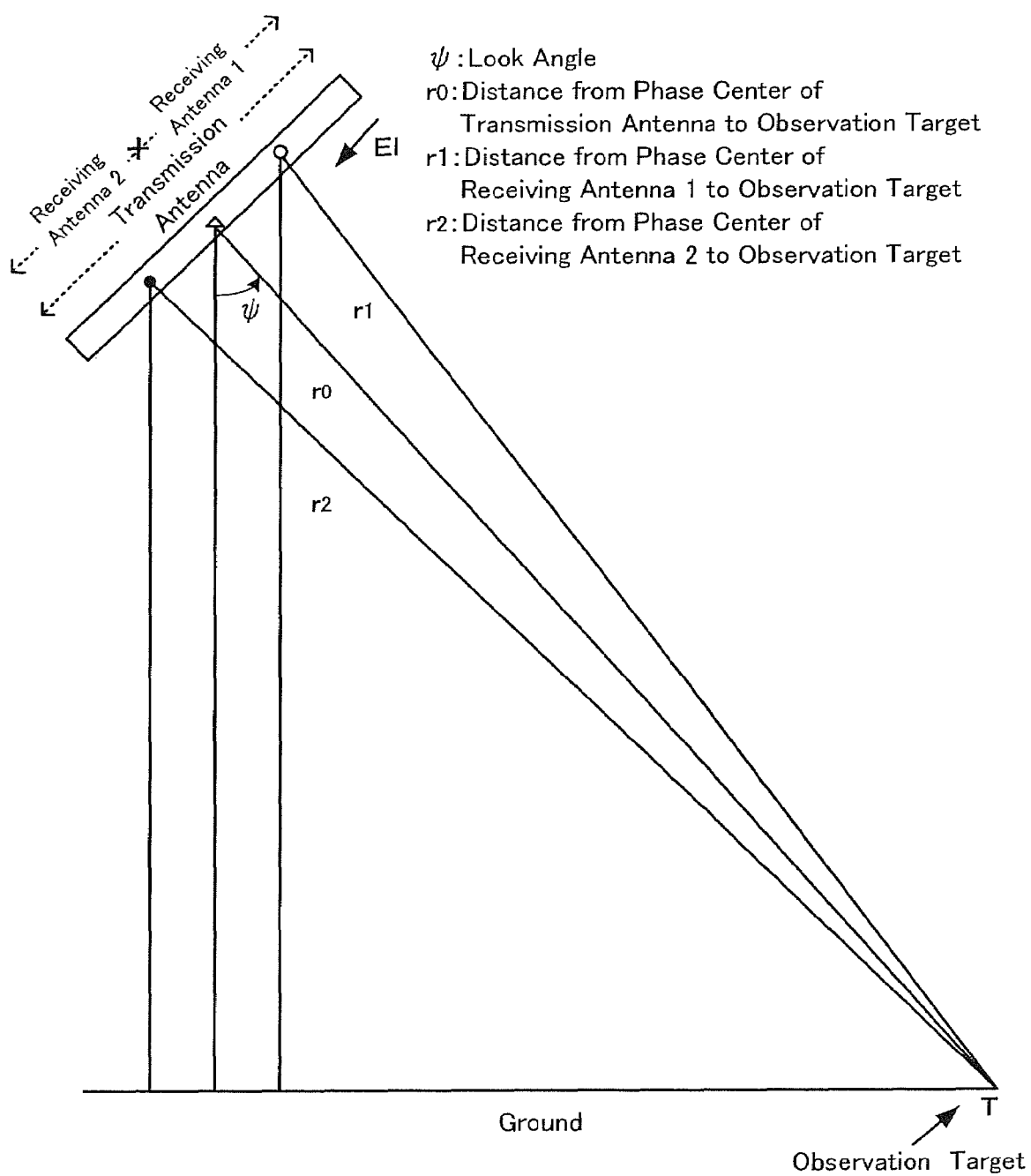
FIG. 4 is an illustration for describing the difference in range from the phase center of the two receiving antennae to a target.

It is to be noted here that there is a slight difference in the range (Rg) distances to the target T from the receiving antenna 1 (or the receiving antenna 104*a*) and the receiving antenna 2 (or the receiving antenna 104*b*) as illustrated in FIG. 4. The difference in the range distances (r2−r1) of the two receiving antennae 1 and 2 can be calculated from the following equations based upon the distances (L1+L2) between the phase centers of the both receiving antennae 1 and 2, the tilt angle of the antennae $\theta$ with respect to the ground and the look angle $\phi$. FIG. 4 is an illustration for describing the difference of the range distances from the phase centers of the two receiving antennae to the target.

$$r1-r0=-L1 \times \sin(\theta-\phi)$$

$$r2-r0=L2 \times \sin(\theta-\phi)$$

$$\therefore r2-r1=(L1+L2)\times\sin(\theta-\phi)$$

where, $\theta$: tilt angle of antenna $\phi$: look angle r0: distance from phase center of transmission antenna to target T r1: distance from phase center of receiving antenna 1 to target T r2: distance from phase center of receiving antenna 2 to target T L1: distance between phase center of transmission antenna to phase center of receiving antenna 1

L2: distance between phase center of transmission antenna and phase center of receiving antenna 2

When synthesizing the bands of the receiving data 1 (or the receiving data 107*a*) and the receiving data 2 (or the receiving data 107*b*), correction will be made on the receiving data 1 and the receiving data 2 in the same manner as the range migration correction in the SAR image reproduction (i.e., range cue correction, range curvature correction) based upon the above difference in the range distances (r2−r1).

Figure 5:
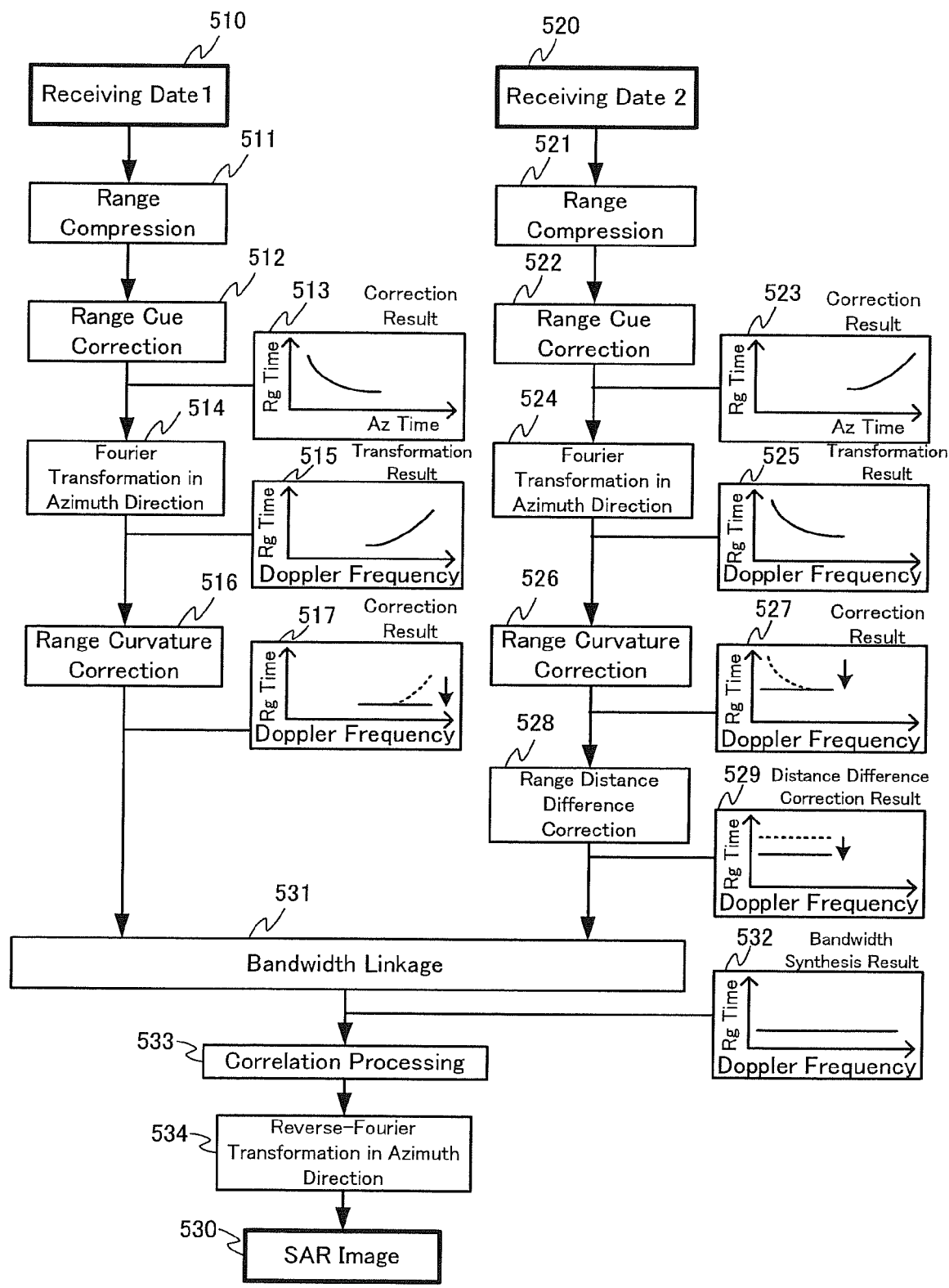
FIG. 5 is a flowchart for showing one example of the processing method of reproducing SAR image reproduction in the bandwidth synthesis and SAR image reproduction processing unit of the present invention.

Now, FIG. 5 illustrates an exemplified processing, wherein the bandwidth synthesis processing of the receiving data 1 and the receiving data 2 is integrated with the SAR reproduction processing in the bandwidth synthesis and SAR image reproduction processing unit 110. In the flowchart of an exemplified method of SAR image reproduction processing according to the present invention in the bandwidth synthesis and SAR image reproduction processing unit 110 as illustrated in FIG. 5, the SAR image reproduction processing method is an example that employs the range Doppler method.

In FIG. 5, range compression processing (steps 511 and 521) and range cue correction processing (steps 512 and 522) for the SAR image reproduction are first performed on the receiving data 1 and the receiving data 2 that are received in steps 510 and 520, respectively. It is to be noted that the range cue correction processing in steps 512 and 522 are intended to correct range cue amount in consideration of the subsequent bandwidth synthesis. Consequently, results of the correction are shown in numerals 513, 523 in FIG. 5. The correction results 513, 523 of the range cue amounts are shown by the solid lines that represent the receiving signals from a single target.

The horizontal axis in the correction results 513, 523 represents the time in the azimuth direction (Az time) that is defined by the sequence of transmitted pulses, i.e., the moving distance in the azimuth direction. On the other hand, the vertical axis represents the time in the range direction (Rg time) that is defined by the sampling sequence in the receiving gate, thereby corresponding to the range distance for both transmission and receiving. As for the correction result 513 of the receiving data 1, since the beam of the receiving antenna 1 (or the receiving antenna 104*a*) is tilted to the moving direction as described hereinabove with reference to FIG. 1, the Rg time or the range distance tends to decrease as a function of the Az time. This means that the range distance decreases as the SAR moves. On the other hand, the Rg time for the correction result 523 of the receiving data 2 tends to increase as the function of the Az time because of the opposite reason.

Since the receiving antenna 1 (or the receiving antenna 104*a*) faces to the moving direction, while the receiving antenna 2 (or the receiving antenna 104*b*) faces to the opposite direction thereto, the comparison of the correction results 513, 523 show that start points in the Az time of the correction result 523 of the receiving data 2 from the receiving antenna 2 facing to opposite to the moving direction lags. Since the range distance for the receiving antenna 2 is longer than that of the receiving antenna 1, the correction result 523 also lags at the point when the Rg time becomes minimum.

Subsequently, Fourier transformation of both of the receiving data 1 and the receiving data 2 that are corrected in the arrange cue amount is performed in the azimuth direction (steps 514, 524). The results of Fourier transformation are shown by numerals 515, 525 in FIG. 5. The Fourier transformation results 515, 525 show receiving signal from a single point target by solid lines.

The horizontal axis of the Fourier transformation results 515, 525 represents the Doppler frequency, while the vertical axis represents the time in the range direction (i.e., the Rg time). The transformation result 515 of the receiving antenna 1 (the receiving antenna 104*a*) whose beam is directed to the moving direction is placed at the higher frequency side, while the transformation result 525 of the receiving antenna 2 (the receiving antenna 104*b*) whose beam is directed to the opposite to the moving direction is placed at the lower frequency side. As apparent from FIG. 5, the transformation result 515 tends to increase in the Rg time as the Doppler frequency increases, while the transformation result 525 tends to decrease in the Rg time as the Doppler frequency increases.

Moreover, a range curvature correction is made for correcting the trend of changing the Rg time with respect to the Doppler frequency (steps 516, 526). Numerals 517, 527 show the results of the range curvature correction. Similar to the correction results 515, 525, in the correction results 517, 527, the horizontal axis represents the Doppler frequency and the vertical axis represents the time in the range direction (i.e., the Rg time). Each or the correction results 517, 527 makes a correction on the respective correction results 515, 525 as shown by arrows so that the Rg time is represented by a constant line with respect to the Doppler frequency that is determined by the distance from the target.

A correction is then made for the range distance difference (r1–r2) between both of the receiving data 517 and the receiving data 527 for the receiving data 1 and the receiving data 2 after the range curvature correction (step 528). Since the range distance difference (r2–r1) is equal to the Rg time difference, the correction can be made by shifting the data in the same way as the range curvature correction. A numeral 529 in FIG. 5 is the distance difference correction result in which the correction for the range distance difference (r2–r1) is made on the correction result 527 of the receiving data 2. As shown by an arrow, a correction equal to the distance difference (r2–r1) is made on the correction result 527.

Then, the range curvature correction result 517 of the receiving data 1 and the distance difference correction result 529 of the receiving data 2 are bandwidth synthesized as a single data (step 531). The bandwidth synthesis result is represented by a numeral 532 in FIG. 5 as a single bandwidth synthesis data that combines or integrates the correction result 517 and the distance difference correction result 529.

Subsequently, a correlation processing is performed (step 533) before performing a inverse Fourier transformation in the azimuth direction (step 534), thereby reproducing a final SAR image 530.

Although the flowchart in FIG. 5 illustrates an example of performing the bandwidth synthesis in the SAR image reproduction method using the range Doppler technique as described hereinabove, it is also possible to similarly perform the SAR image reproduction processing using any SAR image reproduction method other than the range Doppler technique. It is also possible to separately perform the bandwidth synthesis and the SAR image reproduction.

(Advantages of the Exemplified Embodiment)

The synthetic aperture radar according to the above exemplified embodiment of the present invention exhibits the following practical advantages. Firstly, it is possible to synthesize the receiving data having the bandwidth of about two times as wide as the Doppler bandwidth corresponding to the beam width of the receiving antenna in a single system, thereby doubling the resolution in the azimuth direction.

Figure 8:
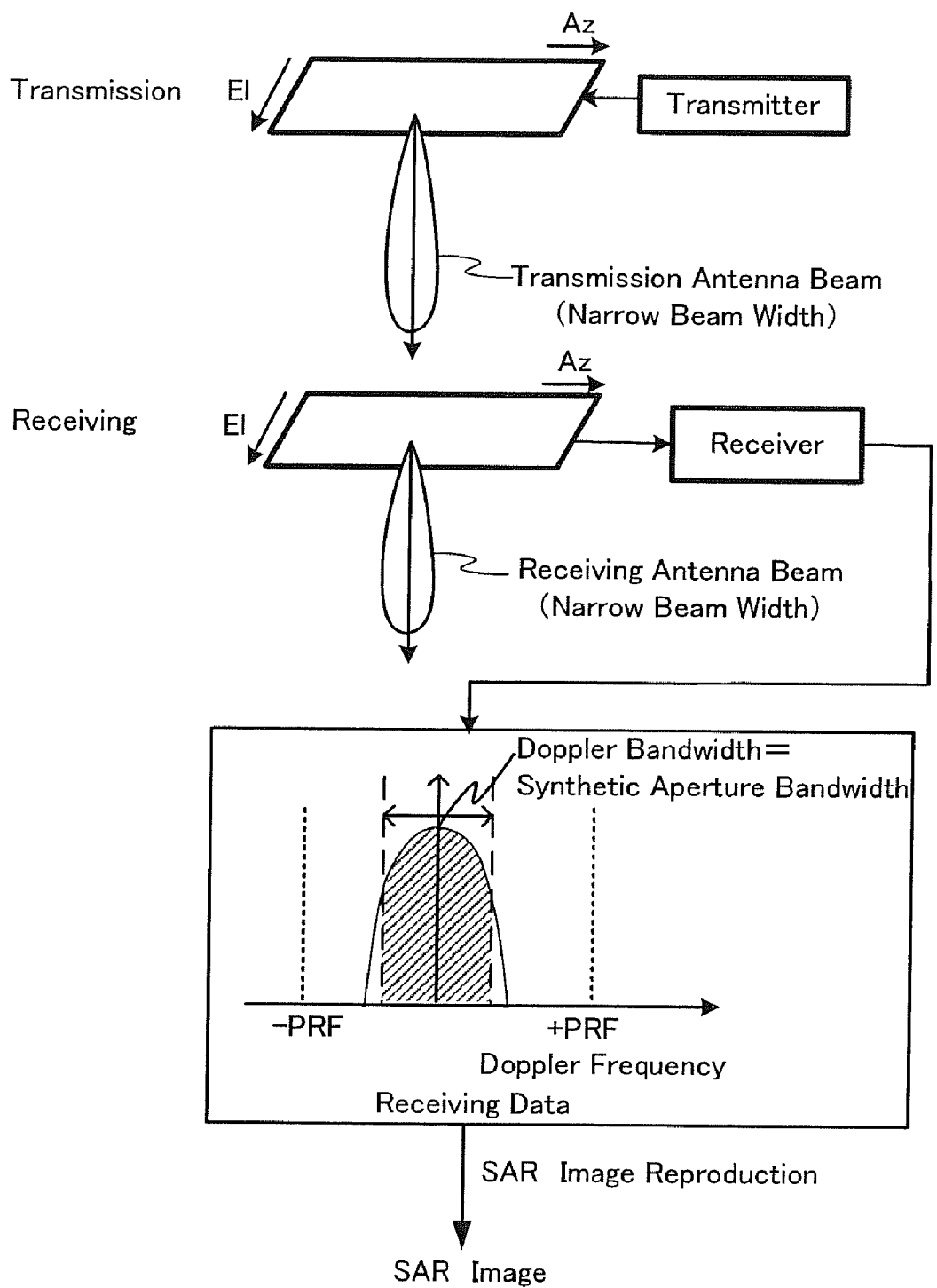
FIG. 8 is an illustration for describing problems associated with SAR image reproduction in the normal SAR.

Secondly, since the PRF (pulse repetition frequency) of the receiving data for each receiver may be any value over the original Doppler bandwidth, it is possible to increase the PRF and thus increasing the beam bandwidth for wider observation bandwidth as compared to the normal synthetic aperture radar as described with reference to FIG. 8, wherein the PRF must be increased in order to achieve high resolution.

Figure 9:
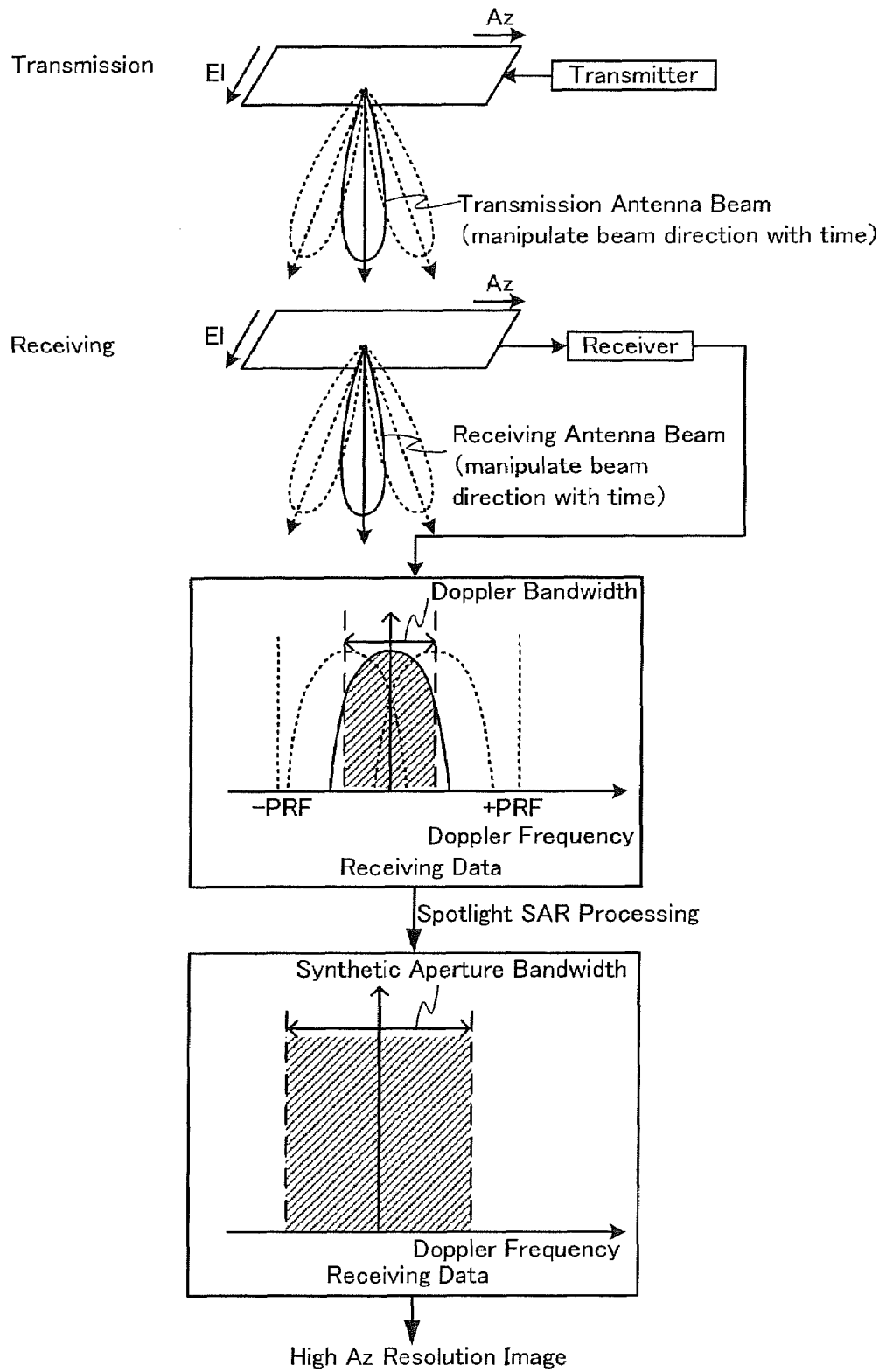
FIG. 9 illustrates how SAR image is reproduced in the spotlight SAR.

Thirdly, since it is not a spotlight observation as described with reference to FIG. 9, it is possible to perform the stripmap observation. Moreover, unlike the case of the spotlight SAR, the receiving antenna pattern in the azimuth direction can be fixed, thereby making the antenna control simpler as compared to the case of the spotlight SAR.

Figure 10:
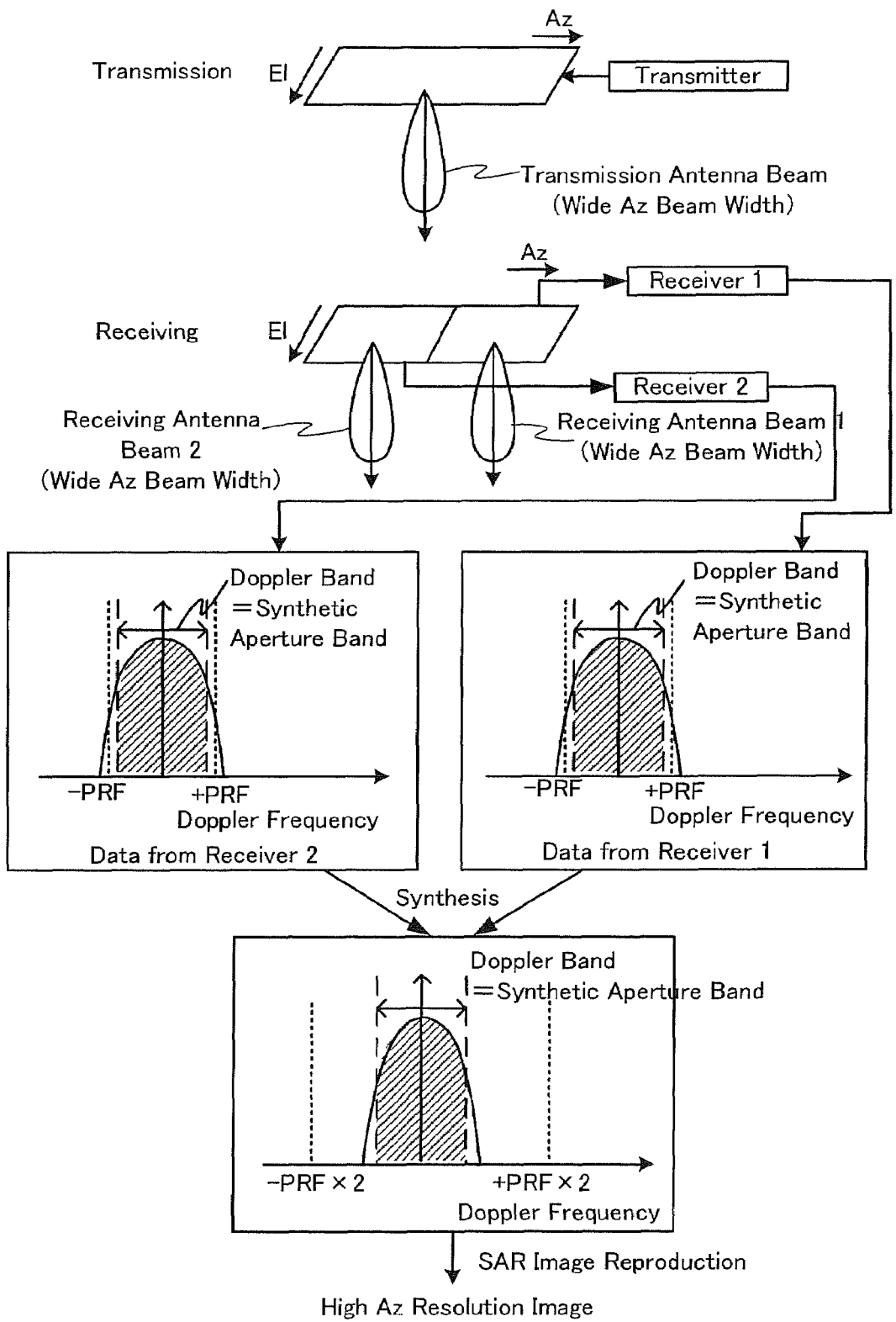
FIG. 10 illustrates how SAR image is reproduced in the DRA mode of the TerraSAR-X.
Figure 11:
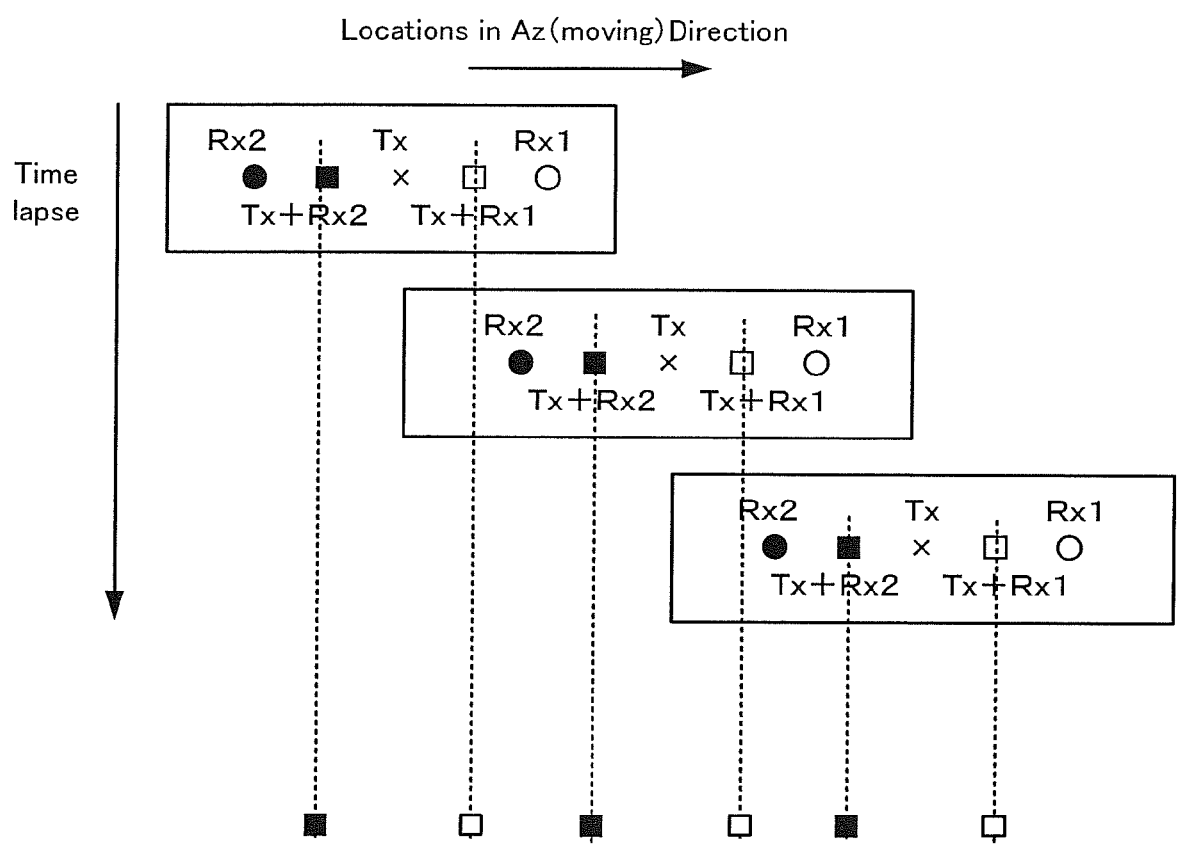
FIG. 11 illustrates the phase relationship of the transmission and receiving beams in the DRA mode of the TerraSAR-X.

Fourthly, unlike the case of improving resolution in the DRA mode of the TerraSAR-X as described above with reference to FIGS. 10 and 11, the PRF can be set to any value higher than the Doppler bandwidth and the sampling theory can be met with the receiving data of a single system without synthesizing the receiving data of two systems for reproducing the SAR image, thereby enabling to easily apply to a quick look processing.

As understood from the foregoing descriptions, the synthetic aperture radar according to the present invention achieves both of high resolution in the azimuth direction and wide range observation. Also, it achieves a simpler antenna control, a stripmap observation, an arbitrary PRF setting and a simpler quick look processing.

Additionally, in case of a synthetic aperture radar for performing a polarimetry observation using horizontally and vertically polarized waves, since there are receivers for two systems, the synthetic aperture radar according to the present invention can be applied by the effective use of the existing receivers for two systems without causing significant hardware impact.

(Other Embodiments of the Present Invention)

Although a single common antenna is used for both of the transmission and receiving antennae in the exemplary embodiment that has been described hereinabove, separate antennae may be used therefor. Additionally, although a single array antenna is divided into two in the elevation direction for the two receiving antennae in the above exemplary embodiment, it is of course possible to employ two separate antennae.

Similarly, although the phase setting of each element of the array antennae is made as the directivity setting means of the receiving antennae in the above described exemplary embodiment, it is possible to set directivity of the receiving antenna to the predetermined direction at the beginning.

Figure 6:
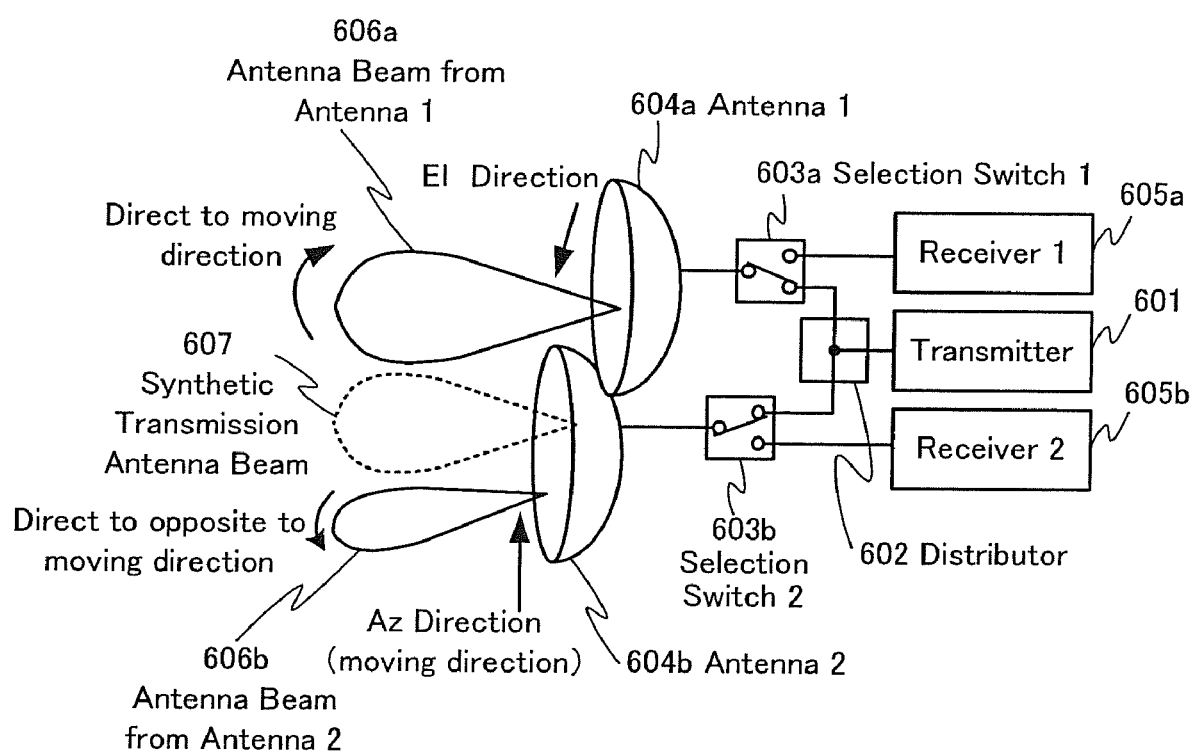
FIG. 6 is a conceptual illustration of an example of the synthetic aperture radar according to the present invention but different from the one in FIG. 1.

For example, it is possible to configure with two antennae at the beginning as illustrated in FIG. 6. FIG. 6 is a conceptual illustration of an example of the synthetic aperture radar different from FIG. 1 according to the present invention. The synthetic aperture radar as shown in FIG. 6 comprises a transmitter 601, a distributor 602, a pair of switches 603a, 603b, a pair of antennae 604a, 604b and a pair of receivers 605a, 605b.

The pair of antennae 604a, 604b are disposed side-by-side in the elevation (E1) direction. The output from the transmitter 601 are distributed to the pair of the antennae 604a, 604b by way of the distributor 602 and the switches 603a, 603b for transmission as a transmission wave of a synthesized antenna beam 607 from the pair of antennae 604a, 604b. receiving waves by the pair of antennae 604a, 604b are received by the pair of receivers 605a, 605b by way of the switches 603a, 603b, respectively. The transmission and receiving as described hereinabove are realized by switching the paths when transmitting and receiving by the switches.

The pair of antennae 604a, 604b are set so that one of the antennae faces the moving direction, while the other antenna faces the opposite direction. The transmission antenna beam is a combination of the antenna beams 606a, 606b from the pair of antennae 604a, 604b and has the beam width that is wider in the azimuth direction. On the other hand, the receiving antenna beams are equal to the antenna beams 606a, 606b of the pair of antennae 604a, 604b. In the above configuration, realized are transmission of the transmission antenna pattern wider in the azimuth direction as well as two receiving antenna beams directed to the moving direction and the opposite direction thereto. It is to be noted that the pair of receiving data received by the pair of receivers 605a, 605b are performed bandwidth synthesis/SAR image reproduction processing for reproducing high Az resolution SAR image similarly to those of the aforementioned embodiment.

It is also possible to provide a pair of feeds to a single parabola antenna in the same manner as shown in FIG. 1 for achieving high Az resolution SAR image under the same conditions as the aforementioned exemplary embodiment.

Figure 7:
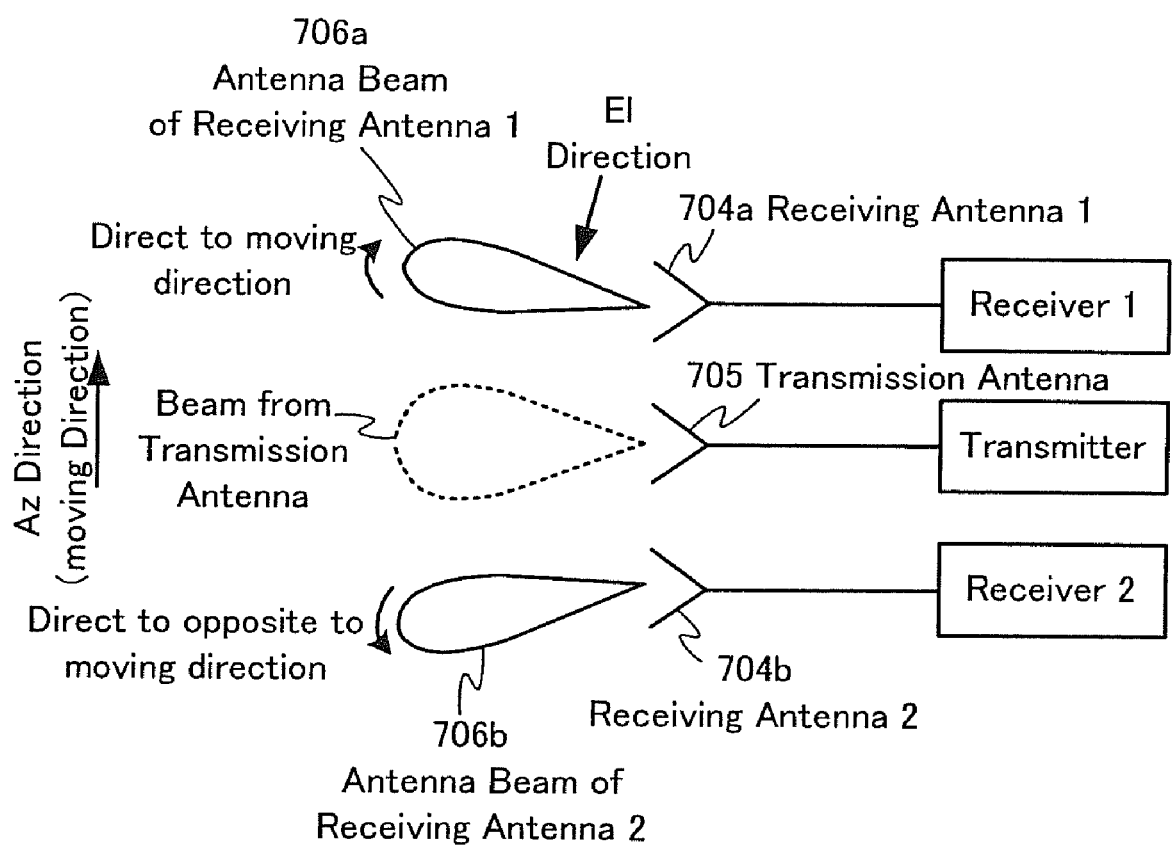
FIG. 7 is a conceptual illustration of a further different example of the synthetic aperture radar according to the present invention.

If transmission of a transmission antenna pattern with a wide beam width in the azimuth direction and receiving by a pair of receiving antennae one directed to the moving direction while the other directed to the opposite direction are achieved, the receiving antennae for two systems may be disposed in the azimuth direction. For this end, it may be configured, for example, as shown in FIG. 7. FIG. 7 is a conceptual illustration of further different exemplified embodiment of the synthetic aperture radar according to the present invention comprising receiving antennae 704a, 704b for two systems and a single small transmission antenna 705 disposed in the azimuth direction. A receiving antenna beam 706a of one of the receiving antennae 704a, 704b is directed to the moving direction, while a receiving antenna beam 706b of the other receiving antenna is directed to the opposite direction.

The exemplary embodiments of the synthetic aperture radar according to the present invention have been described hereinabove. However, it should be noted that these embodiments are noting but examples of the present invention and not for the purpose of restricting the present invention. It is understood that a person having an ordinary skill in the art can easily make various modifications and alternations without departing from the scope and spirit of the present invention.

What is claimed is:

1. A synthetic aperture radar for installation on a movable platform to acquire radar images along a given surface, the given surface selected from a plurality of surfaces comprising a ground surface and a sea surface, the synthetic aperture radar comprising:
   a transmission antenna to output a transmission antenna beam, the transmission antenna beam having a width in a direction in which the movable platform is to move along the given surface;
   a first receiving antenna to receive a first receiving antenna beam having a width that is half the width of the transmission antenna beam, where the first receiving antenna beam is directed to the direction in which the movable platform is to move along the given surface; and,
   a second receiving antenna to receive a second receiving antenna beam having a width that is half the width of the transmission antenna beam, where the second receiving antenna beam is directed to a direction opposite to the direction in which the movable platform is to move along the given surface.

2. The synthetic aperture radar of claim 1, further comprising a single array antenna divisible into a first array antenna portion and a second array antenna portion along a direction perpendicular to the direction in which the movable platform is to move along the given surface,
   wherein the first receiving antenna is the first array antenna portion of the single array antenna, and the second receiving antenna is the second array antenna portion of the single array antenna.

3. The synthetic aperture radar of claim 2, wherein the width of each of the first receiving antenna beam and the second receiving antenna beam is half the width of the transmission antenna beam by one of:
   phase setting each of a plurality of array antenna elements of the single array antenna;
   in an electrical manner, operationally decreasing an antenna size of the transmission antenna so that the antenna size of the transmission antenna is operationally equal to half of an antenna size of the first receiving antenna and to half of an antenna size of the second receiving antenna.

4. The synthetic aperture radar of claim 2, wherein the first receiving antenna beam is directed to the direction in which the movable platform is to move along the given surface, and the second receiving antenna beam is directed to the direction opposite to the direction in which the movable platform is to move along the given surface by:
   phase setting each of a plurality of array antenna elements of the single array antenna.

5. The synthetic aperture radar of claim 1, wherein the first receiving antenna and the second receiving antenna are separate antennas disposed along a direction perpendicular to the direction in which the movable platform is to move along the given surface, and wherein the transmission antenna is a same antenna as one or more of the separate antennas, such that the one or more of the separate antennas function as the transmission antenna.

6. The synthetic aperture radar of claim 1, wherein the transmission antenna, the first receiving antenna, and the second receiving antenna are separate antennas disposed along a direction perpendicular to the direction in which the movable platform is to move along the given surface.

7. The synthetic aperture radar of claim 6, wherein one of:

an antenna size of the transmission antenna is physically equal to half of an antenna size of the first receiving antenna and half of an antenna size of the second receiving antenna along the direction in which the movable platform is to move along the given surface;

in an electrical manner, the antenna size of the transmission antenna is operationally decreased so that the antenna size of the transmission antenna is operationally equal to half of the antenna size of the first receiving antenna and half of the antenna size of the second receiving antenna along the direction in which the movable platform is to move along the given surface.

8. The synthetic aperture radar of claim 1, wherein the transmission antenna, the first receiving antenna, and the second receiving antenna are separate antennas disposed along the direction in which the movable platform is to move along the given surface.

9. The synthetic aperture radar of claim 8, wherein one of:

an antenna size of the transmission antenna is physically equal to half of an antenna size of the first receiving antenna and half of an antenna size of the second receiving antenna along the direction in which the movable platform is to move along the given surface;

in an electrical manner, the antenna size of the transmission antenna is operationally decreased so that the antenna size of the transmission antenna is operationally equal to half of the antenna size of the first receiving antenna and half of the antenna size of the second receiving antenna along the direction in which the movable platform is to move along the given surface.

10. The synthetic aperture radar of claim 1, wherein the first receiving antenna is slanted towards the direction in which the movable platform is to move along the given surface by a distance equal to half the width of the transmission antenna beam, and the second receiving antenna is slanted towards the direction opposite to the direction in which the movable platform is to move along the given surface by the distance equal to half the width of the transmission antenna beam.

11. The synthetic aperture radar of claim 1, wherein the first receiving antenna beam represents first received data within a frequency domain encompassing a Doppler frequency domain, and the second receiving antenna beam represents second received data within the frequency domain encompassing the Doppler frequency domain, and wherein only the Doppler frequency domain of the first received data and only the Doppler frequency domain of the second received data are extracted from the first received data and the second received data, and then bandwidth-synthesized to yield single bandwidth-synthesized received data.

12. The synthetic aperture radar of claim 11, wherein the first receiving antenna has a first range distance between the first receiving antenna and a target, and the second receiving antenna has a second range distance between the second receiving antenna and the target, and wherein a correction is made for a difference between the first range distance and the second range distance during bandwidth-synthesis to yield the single bandwidth-synthesized received data.

13. The synthetic aperture radar of claim 1, wherein the radar is to produce an image of the given surface via a range Doppler approach using the transmission antenna, the first receiving antenna, and the second receiving antenna.

14. A method for producing an image of a given surface using a synthetic aperture radar installed on a movable platform and having a transmission antenna, a first receiving antenna, and a second receiving antenna, the given surface selected from a plurality of surfaces comprising a ground surface and a sea surface, the method comprising:

setting a width of a transmission antenna beam of the transmission antenna equal to twice a width of a first receiving antenna beam of the first receiving antenna and equal to twice a width of a second receiving antenna beam of the second receiving antenna, along a direction in which the movable platform is moving along the given surface;

directing the first receiving antenna to the direction in which the movable platform is moving along the given surface, and direction the second receiving antenna to a direction opposite to the direction in which the movable platform is moving along the given surface; and, producing the image of the given surface based on first received data represented by the first receiving antenna beam and based on second received data represented by the second receiving antenna beam.

* * * * *